(12) United States Patent
Sun et al.

(10) Patent No.: US 9,880,669 B2
(45) Date of Patent: Jan. 30, 2018

(54) TOUCH PANEL WITH INFRARED LIGHT RECEIVING ELEMENTS, AND DISPLAY DEVICE

(71) Applicants: BOE Technology Group Co., Ltd., Beijing (CN); Beijing BOE Display Technology Co., Ltd., Beijing (CN)

(72) Inventors: Wenjia Sun, Beijing (CN); Kai Diao, Beijing (CN); Inho Park, Beijing (CN)

(73) Assignees: BOE Technology Group Co., Ltd., Beijing (CN); Beijing BOE Display Technology Co., Ltd., Beijing (CN)

( * ) Notice: Subject to any disclaimer, the term of this patent is extended or adjusted under 35 U.S.C. 154(b) by 105 days.

(21) Appl. No.: 14/751,331

(22) Filed: Jun. 26, 2015

(65) Prior Publication Data
US 2016/0239151 A1    Aug. 18, 2016

(30) Foreign Application Priority Data
Feb. 16, 2015   (CN) .......................... 2015 1 0084891

(51) Int. Cl.
*G06F 3/042*    (2006.01)

(52) U.S. Cl.
CPC .. *G06F 3/0421* (2013.01); *G06F 2203/04109* (2013.01)

(58) Field of Classification Search
CPC .............................. G06F 3/0421; G06F 3/0412
See application file for complete search history.

(56) References Cited

U.S. PATENT DOCUMENTS

| 4,305,071 A * | 12/1981 | Bell | G06F 3/037 250/549 |
| 6,972,753 B1 * | 12/2005 | Kimura | G06F 3/0428 178/18.09 |
| 8,259,088 B1 * | 9/2012 | D'Souza | G06F 3/0423 178/18.09 |
| 8,269,740 B2 | 9/2012 | Sohn et al. | |

(Continued)

FOREIGN PATENT DOCUMENTS

| CN | 101819340 A | 9/2010 |
| CN | 101916151 A | 12/2010 |

(Continued)

OTHER PUBLICATIONS

Feb. 3, 2017—(CN) First Office Action Appn 201510084891.8 with English Tran.

*Primary Examiner* — Nicholas Lee
*Assistant Examiner* — Robert Stone
(74) *Attorney, Agent, or Firm* — Banner & Witcoff, Ltd.

(57) ABSTRACT

A touch panel and a display device are provided. The touch panel includes a touch substrate; two first photodetectors disposed at both ends of a side of the touch substrate, wherein the touch substrate is divided into a first touch area and a second touch area, the second touch area is in a location corresponds to the detection blind zone of the two first photodetectors, and the two first photodetectors are configured to determine the position of a touch point in the first touch area; and a second photodetector disposed at peripheral of the touch substrate which can emit and receive infrared light and are configured to determine a position of a touch point in the second touch area.

19 Claims, 2 Drawing Sheets

(56) References Cited

U.S. PATENT DOCUMENTS

| | | | |
|---|---|---|---|
| 8,723,837 B1* | 5/2014 | Fu | G06F 3/0423 178/18.09 |
| 2005/0156900 A1* | 7/2005 | Hill | G06F 3/0428 345/173 |
| 2009/0167656 A1* | 7/2009 | Ahn | G02F 1/1336 345/87 |
| 2009/0309844 A1* | 12/2009 | Woo | H01J 11/12 345/173 |
| 2010/0156825 A1* | 6/2010 | Sohn | G06F 3/0428 345/173 |
| 2010/0295821 A1* | 11/2010 | Chang | G06F 3/0421 345/175 |
| 2011/0032213 A1* | 2/2011 | Pienimaa | G06F 3/0416 345/175 |
| 2011/0061950 A1* | 3/2011 | Cheng | G06F 3/0428 178/18.09 |
| 2011/0134078 A1* | 6/2011 | Hsu | G01C 3/08 345/175 |
| 2011/0157050 A1* | 6/2011 | Jang | G06F 3/0428 345/173 |
| 2011/0157097 A1* | 6/2011 | Hamada | G02F 1/13338 345/175 |
| 2011/0163998 A1* | 7/2011 | Goertz | G06F 3/0416 345/175 |
| 2011/0187678 A1* | 8/2011 | Salaverry | G06F 3/0428 345/175 |
| 2011/0304538 A1* | 12/2011 | Miyake | G06F 3/03547 345/158 |
| 2012/0146950 A1* | 6/2012 | Park | G06F 3/0421 345/175 |
| 2012/0212441 A1* | 8/2012 | Christiansson | G06F 3/0416 345/173 |
| 2012/0318957 A1* | 12/2012 | Lai | G06F 3/0428 250/206.1 |
| 2013/0021302 A1* | 1/2013 | Drumm | G06F 3/0421 345/175 |
| 2013/0127713 A1* | 5/2013 | Yang | G06F 3/0421 345/158 |
| 2013/0201156 A1* | 8/2013 | Picciotto | G06F 3/0421 345/175 |
| 2013/0285788 A1* | 10/2013 | Itaya | G06F 3/045 338/47 |
| 2015/0212652 A1* | 7/2015 | Lin | G06F 3/0421 345/175 |
| 2015/0253934 A1* | 9/2015 | Lin | G06F 3/0428 345/175 |
| 2016/0034106 A1* | 2/2016 | Kuo | G06F 3/0325 345/175 |

FOREIGN PATENT DOCUMENTS

| | | | |
|---|---|---|---|
| CN | 102023762 A | 4/2011 | |
| CN | 102033640 A | 4/2011 | |
| CN | 102103442 A | 6/2011 | |
| CN | 202084020 U | 12/2011 | |
| CN | 103019467 A | 4/2013 | |
| CN | 103092430 A | 5/2013 | |
| CN | 103593091 A | 2/2014 | |
| WO | WO 0058820 A1 * | 10/2000 | G06F 3/0423 |

* cited by examiner

TOUCH PANEL WITH INFRARED LIGHT RECEIVING ELEMENTS, AND DISPLAY DEVICE

This application claims priority to Chinese Patent Application No. 201510084891.8 filed on Feb. 16, 2015. The present application claims priority to and the benefit of the above-identified application and is incorporated herein in its entirety.

TECHNICAL FIELD

Embodiments of the present invention relate to a touch panel and a display device including the touch panel.

Touch technology is a novel human machine interaction approach that has been the development hotspot in recent years and applied widely in various information systems due to its more natural and more straightforward operation experience. For the large size display field, the touch modes mainly include optical touch and infrared touch.

SUMMARY

According to an embodiment of the present invention, a touch panel is provided. The touch panel includes a touch substrate; two first photodetectors disposed at two ends of a side of the touch substrate, wherein the touch substrate is divided into a first touch area and a second touch area, the second touch area is in a location corresponds to a detection blind zone of the two first photodetectors, and the first photodetectors are configured to determine a position of a touch point in the first touch area; and a second photodetector disposed at peripheral of the touch substrate which can emit and receive infrared light and are configured to determine a position of a touch point in the second touch area.

According to an embodiment of the present invention, a display device is provided, wherein the display device includes the touch panel.

BRIEF DESCRIPTION OF THE DRAWINGS

Embodiments of the present invention will be described in more detail below with reference to the accompanying drawings to enable those skilled in the art to understand the present invention more clearly, wherein.

DETAILED DESCRIPTION

The technical solutions of the embodiments of the present disclosure will be described in a clearly and fully understandable way in connection with the drawings related to embodiments of the disclosure. Apparently, the described embodiments are just a part but not all of the embodiments of the disclosure. Based on the described embodiments herein, those skilled in the art can obtain other embodiment(s), without any inventive work, which shall fall within the protection scope of the present disclosure.

Unless otherwise defined, all the technical and scientific terms used herein have the same meanings as commonly understood by one of ordinary skill in the art to which the present disclosure belongs. The terms, such as "first," "second," or the like, which are used in the description and the claims of the present application, are not intended to indicate any sequence, amount or importance, but for distinguishing various components. Also, the terms, such as "a/an," "one," or the like, are not intended to limit the amount, but for indicating the existence of at lease one. The terms, such as "comprise/comprising," "include/including," or the like are intended to specify that the elements or the objects stated before these terms encompass the elements or the objects and equivalents thereof listed after these terms, but not preclude other elements or objects. The terms, "on," "under," or the like are only used to indicate relative position relationship, and when the position of the object which is described is changed, the relative position relationship may be changed accordingly.

Figure 1:
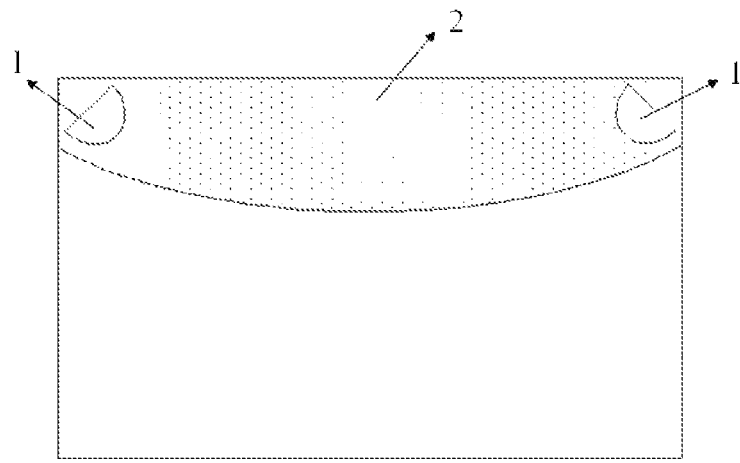
FIG. 1 is a schematic diagram of an optical touch panel.

FIG. 1 is a schematic diagram of an optical touch panel that typically uses CCD detectors 1 to determine a touch position. However, a touch blind zone 2 would appear on a side of the touch panel close to the CCD detectors 1 due to the limitation by detection angles. The touch blind zone 2 can not sense a touch and has a strong impact on touch experience.

A solution to this problem is to manufacture the touch blind zone 2 into the frame of the overall unit such that this part of area will not appear in the visible area. Though this method will not increase cost, it will influence the appearance effect of a display screen. Another solution is to add another CCD detector at the middle part of the long side. Yet for an optical touch panel, CCD detectors are its largest cost and this method could increase production costs significantly.

Figure 2:
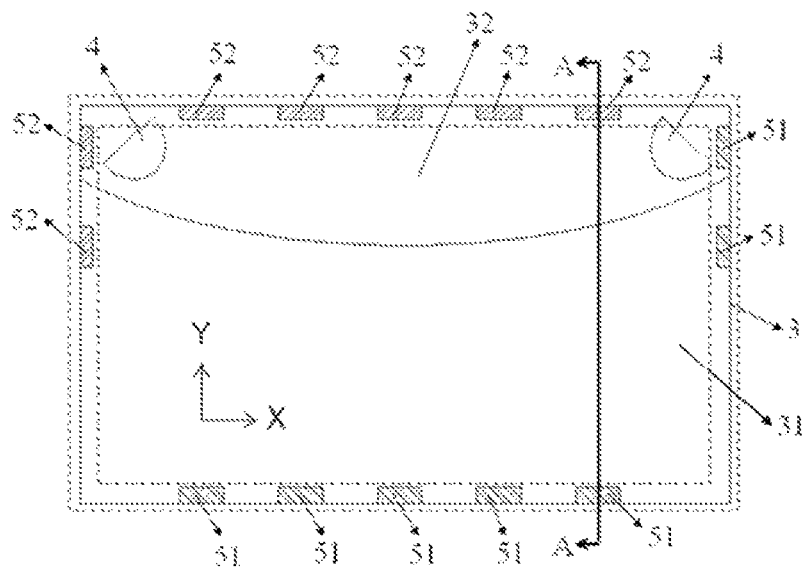
FIG. 2 is a schematic plan view of a touch panel according to an embodiment of the present invention.

An embodiment of the present invention firstly provides a touch panel as shown in FIG. 2, which includes a touch substrate 3 and two first photodetectors 4 disposed at two ends of a side of the touch substrate 3. The touch substrate 3 is divided into a first touch area 31 and a second touch area 32. The second touch area 32 is in location corresponds to the detection blind zone of two first photodetectors 4. The first photodetectors 4 are configured to determine positions of touch points in the first touch area 31. The touch panel further includes second photodetectors disposed at peripheral of the touch substrate 3 (as shown in the dashed line box in FIG. 2). The second photodetectors can emit and receive infrared light and are configured to determine positions of touch points in the second touch area 32.

In the embodiment of the present invention, conventional optical detectors and infrared detectors are used in combination to determine positions of touch points and the infrared detectors are used to detect the touch blind zone of original optical detectors, which effectively addresses the technical problem of the prior art that the touch blind zone can not sense touch. The touch panel provided in embodiments of the present invention has advantages of integrated touch and no touch blind zone, improves user's touch experience and can use light emitting/photosensitive diodes of low price, thereby realizing reduced costs as compared to prior art method in which additional CCDs are added to sense touch blind zone.

Figure 3:
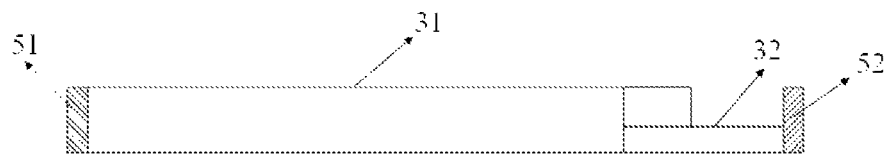
FIG. 3 is a sectional view along A-A direction in FIG. 2.

For example, as shown in FIG. 3, a sectional view along A-A direction in FIG. 2, the top surface of the first touch area 31 is higher than the top surface of the second touch area 32.

The second photodetector includes at least two sets of oppositely disposed infrared light emitting elements 51 and infrared light receiving elements 52 for determining coordinates in X axis direction and coordinates in Y axis direction of touch points in the second touch area 32 (FIG. 3 shows only a set of infrared light emitting elements 51 and infrared light receiving elements 52 disposed in Y direction in FIG. 2).

For example, referring to FIG. 2 as an example, it is possible to dispose infrared light emitting elements 51 and infrared light receiving elements 52 in both X direction and Y direction according to the area of detection blind area formed by the first photodetectors 4. The infrared light emitting elements 51 and infrared light receiving elements 52 form an infrared light matrix covering the second touch area 32 over the second touch area 32 (namely the original detection blind zone) which is configured to detect coordinates of touch points in the second touch area 32.

When no touch operation is performed, the infrared light emitted by the infrared light emitting elements 51 can transmit the part of touch substrate 3 corresponding to the first touch area 31 and arrive at the infrared light receiving elements 52 through the second touch area 32.

As a first implementation, the first photodetector 4 may be a CCD detector or an optical camera for determining positions of touch points in the first touch area 31 by capturing touch positions of fingers. When a finger touches a point in the second touch area 32 (namely the detection blind zone of the first photodetector 4), the infrared light at the touch point is blocked, and there are two rays of infrared light along X direction and Y direction that can not arrive the infrared light receiving elements 52. Therefore, it is possible to determine coordinates of the touch point in the second touch area 32 by detecting coordinates of the position where the infrared light is blocked.

As a second implementation, the first photodetector 4 may not have the picture taking function, that is, the first photodetector 4 may only have light receiving function. For example, it can be a light-sensitive detector with simple structure so as to reduce product cost.

Figure 4:
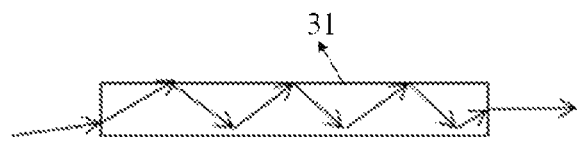
FIG. 4 is a schematic diagram of light path of light total reflection in a touch substrate where a first touch area is located.

The part of the touch substrate 3 corresponding to the first touch area 31 is of a total reflection material, and adjusts the light emission direction of infrared light emitting elements 51 when no touch operation is performed such that infrared light emitted by infrared light emitting elements 51 can be totally reflected in the part of touch substrate 3 corresponding to the first touch area 31, as shown in FIG. 4. The totally reflected light propagates through the second touch area 32 to reach infrared light receiving elements 52 in a nearly parallel direction after exiting from the first touch area 31 at the other end.

Figure 5:
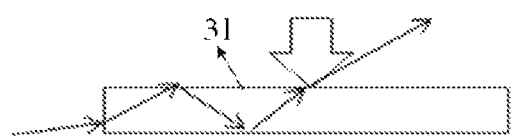
FIG. 5 is a schematic diagram of the changed light path of light total reflection in a touch substrate where a first touch area is located.

In this implementation, the first photodetector 4 can detect infrared light. When the first touch area 31 is touched, the touch substrate 3 experiences slight deformation at the touch position such that conditions for infrared light to be totally reflected in the touch substrate 3 is breached, as shown in FIG. 5, allowing the infrared light to exit from the top surface of the first touch area 31. The first photodetector 4 determines the position of touch point in the first touch area 31 by detecting the exiting position of light.

Typically, each touch panel has a set of independent optical system. The first photodetector 4 can detect the distance between the position of light exiting from the top surface of the first touch area 31 and the position of the first photodetector 4, and the angle between the direction of the exiting light and the optical axis of optical system of the touch panel.

For example, the touch panel further includes a sensing module connected with the signal output terminal of the first photodetector 4. The sensing module can determine the coordinates of the touch point in the first touch area 31 according to the distance between the position of the exiting light detected by the first photodetector 4 and the position of the first photodetector 4, and the angle between the direction of the exiting light and the optical axis of optical system of the touch panel.

Accordingly, signal output terminals of infrared light receiving elements 52 in the second photodetector are also connected with the sensing module. When the second touch area 32 is touched, infrared light at the location of touch point is blocked, and the sensing module determines coordinates of touch point in the second touch area 32 according to the information on coordinates of position of not-received infrared light fed back by the infrared light receiving elements 52.

The infrared light emitting elements 51 may be electroluminescent diodes that emit infrared light while being energized. The infrared light receiving elements 52 may be photosensitive diodes that can generate electric currents while receiving infrared light.

The first photodetector and second photodetector adopted in embodiments of the present invention have advantages of stable performance and low cost and no cover glass is needed. Furthermore, embodiments of the present invention effectively address the technical problem in prior art that the detection blind zone can not sense touch, enabling each area of the touch panel to be available for touch operation and improving user's touch experience. As compared to the prior art method of adding CCD to sense touch blind zone, the embodiments of the present invention can utilize light emitting/photosensitive diodes of low prices so as to reduce product cost.

Typically, the touch substrate 3 is made of a transparent material. For example, a part of the touch substrate 3 that corresponds to the first touch area 31 and a part of the touch substrate 3 that corresponds to the second touch area 32 may be formed as an integrated structure by a same transparent material. Alternatively, a part of the touch substrate 3 that corresponds to the first touch area 31 and a part of the touch substrate 3 that corresponds to the second touch area 32 are made of different transparent materials and assembled to form the touch substrate 3. The material for manufacturing the touch substrate 3 in embodiments of the present invention allows the infrared light to propagate in the part corresponding to the first touch area 31.

An embodiment of the present invention also provides a display device including the touch panel. The display device further includes a display panel. The touch panel is assembled on the display surface of the display panel, for example, the touch panel can be attached or bonded on the display surface of the display panel. The display device provided in the embodiment of the present invention has various advantages, such as integrated touch, and no touch blind zone, and it can improve user's touch experience. As compared to the prior art of adding CCDs to sense the touch blind zone, the embodiments of the present invention can utilize light emitting/photosensitive diodes of low prices, so as to reduce product cost.

It is understood that the above implementations are only illustrative implementations for explaining the principle of the present invention, but the present invention is not limited thereto. A person of ordinary skill in the art can make various modifications and improvements without departing from the spirit and nature of the present invention which shall fall within the scope of the present invention.

The present application claims the priority of Chinese patent application No. 201510084891.8 titled "Touch Panel and Display Device" filed on Feb. 16, 2015, which is incorporated in its entirety herein by reference.

What is claimed is:

1. A touch panel, comprising:
a touch substrate;
two first photodetectors, respectively disposed at ends of a side of the touch substrate, wherein the touch substrate is divided into a first touch area and a second touch area, the second touch area is in a location corresponding to a detection blind zone of the two first photodetectors, and the first photodetectors are configured to determine a position of a touch point in the first touch area; and
a second photodetector disposed at a periphery of the touch substrate which can emit and receive infrared light and is configured to determine a position of a touch point in the second touch area, wherein a top surface of the first touch area is higher than a top surface of the second touch area, the second photodetector comprises at least two sets of oppositely disposed infrared light emitting elements and infrared light receiving elements configured to determine coordinates in an X direction and a Y direction of a touch point in the second touch area, and when no touch operation is performed, an infrared light emitted from the infrared light emitting elements can propagate through a part of the touch substrate that corresponds to the first touch area and arrive at the infrared light receiving elements, passing over the second touch area.

2. The touch panel according to claim 1, wherein a part of the touch substrate that corresponds to the first touch area is of a total reflection material, when no touch operation is performed, the infrared light emitted by the infrared light emitting elements can be totally reflected in the part of the touch substrate that corresponds to the first touch area and arrive at the infrared light receiving elements through the second touch area.

3. The touch panel according to claim 2, wherein the first photodetectors can detect the infrared light, and when the first touch area is touched, the infrared light totally reflected in the touch substrate exits from a top surface of the first touch area, and the first photodetectors determine a position of a touch point in the first touch area by detecting a position of the exiting light.

4. The touch panel according to claim 3, wherein the infrared light emitting elements are electroluminescent diodes that emit the infrared light when being energized, and the infrared light receiving elements are photosensitive diodes that can generate electric current when receiving infrared light.

5. The touch panel according to claim 3, wherein a part of the touch substrate that corresponds to the first touch area and a part of the touch substrate that corresponds to the second touch area are formed as an integrated structure by a same transparent material.

6. The touch panel according to claim 3, wherein a part of the touch substrate that corresponds to the first touch area and a part of the touch substrate that corresponds to the second touch area are made of different transparent materials and assembled to form the touch substrate.

7. The touch panel according to claim 2, wherein the infrared light emitting elements are electroluminescent diodes that emit the infrared light when being energized, and the infrared light receiving elements are photosensitive diodes that can generate electric current when receiving infrared light.

8. The touch panel according to claim 2, wherein a part of the touch substrate that corresponds to the first touch area and a part of the touch substrate that corresponds to the second touch area are made of different transparent materials and assembled to form the touch substrate.

9. The touch panel according to claim 2, wherein a part of the touch substrate that corresponds to the first touch area and a part of the touch substrate that corresponds to the second touch area are formed as an integrated structure by a same transparent material.

10. The touch panel according to claim 1, wherein the infrared light emitting elements are electroluminescent diodes that emit infrared light when being energized, and the infrared light receiving elements are photosensitive diodes that can generate electric current when receiving infrared light.

11. The touch panel according to claim 1, wherein a part of the touch substrate that corresponds to the first touch area and a part of the touch substrate that corresponds to the second touch area are formed as an integrated structure by a same transparent material.

12. The touch panel according to claim 1, wherein a part of the touch substrate that corresponds to the first touch area and a part of the touch substrate that corresponds to the second touch area are made of different transparent materials and assembled to form the touch substrate.

13. A display device comprising a touch panel, wherein the touch panel comprises:
a touch substrate;
two first photodetectors, respectively disposed at ends of a side of the touch substrate, wherein the touch substrate is divided into a first touch area and a second touch area, the second touch area is in a location corresponding to a detection blind zone of the two first photodetectors, and the first photodetectors are configured to determine a position of a touch point in the first touch area; and
a second photodetector disposed at a periphery of the touch substrate which can emit and receive infrared light and is configured to determine a position of a touch point in the second touch area,
wherein a top surface of the first touch area is higher than a top surface of the second touch area, the second photodetector comprises at least two sets of oppositely disposed infrared light emitting elements and infrared light receiving elements configured to determine coordinates in an X direction and a Y direction of a touch point in the second touch area, and when no touch operation is performed, an infrared light emitted from the infrared light emitting elements can propagate through a part of the touch substrate that corresponds to the first touch area and arrive at the infrared light receiving elements, passing over the second touch area.

14. A touch panel, comprising:
a touch substrate;
two first photodetectors, respectively disposed at ends of a side of the touch substrate, wherein the touch substrate is divided into a first touch area and a second touch area, the second touch area is in a location corresponding to a detection blind zone of the two first photodetectors, and the first photodetectors are configured to determine a position of a touch point in the first touch area;

a second photodetector disposed at a periphery of the touch substrate which can emit and receive infrared light and is configured to determine a position of a touch point in the second touch area; and a sensing module connected with a signal output terminal of each of the first photodetectors, wherein the sensing module can determine coordinates of the touch point in the first touch area according to a distance between a position of exiting light detected by each of the first photodetectors and a position of each of the first photodetectors, and an angle between a direction of the exiting light and an optical axis of the optical system of the touch panel, wherein a top surface of the first touch area is higher than a top surface of the second touch area, the second photodetector comprises at least two sets of oppositely disposed infrared light emitting elements and infrared light receiving elements configured to determine coordinates in an X direction and a Y direction of a touch point in the second touch area, and when no touch operation is performed, an infrared light emitted from the infrared light emitting elements can propagate through a part of the touch substrate that corresponds to the first touch area and arrive at the infrared light receiving elements, passing over the second touch area.

15. The touch panel according to claim 14, wherein signal output terminals of infrared light receiving elements in the second photodetector are connected with the sensing module, when the second touch area is touched, infrared light at the position of the touch point is blocked, and the sensing module determines coordinates of the touch point in the second touch area according to coordinate information on a position of not-received infrared light fed back by the infrared light receiving element.

16. The touch panel according to claim 15, wherein the infrared light emitting elements are electroluminescent diodes that emit infrared light when being energized, and the infrared light receiving elements are photosensitive diodes that can generate electric current when receiving infrared light.

17. The touch panel of claim 15, wherein a part of the touch substrate that corresponds to the first touch area and a part of the touch substrate that corresponds to the second touch area are formed as an integrated structure by a same transparent material.

18. The touch panel according to claim 14, wherein the infrared light emitting elements are electroluminescent diodes that emit the infrared light when being energized, and the infrared light receiving elements are photosensitive diodes that can generate electric current when receiving infrared light.

19. The touch panel according to claim 14, wherein a part of the touch substrate that corresponds to the first touch area and a part of the touch substrate that corresponds to the second touch area are formed as an integrated structure by a same transparent material.

* * * * *